Jan. 7, 1958 C. H. BROWN 2,819,377
WATER-HEATING APPARATUS FOR USE IN MAKING HOT BEVERAGES
Filed Oct. 22, 1956
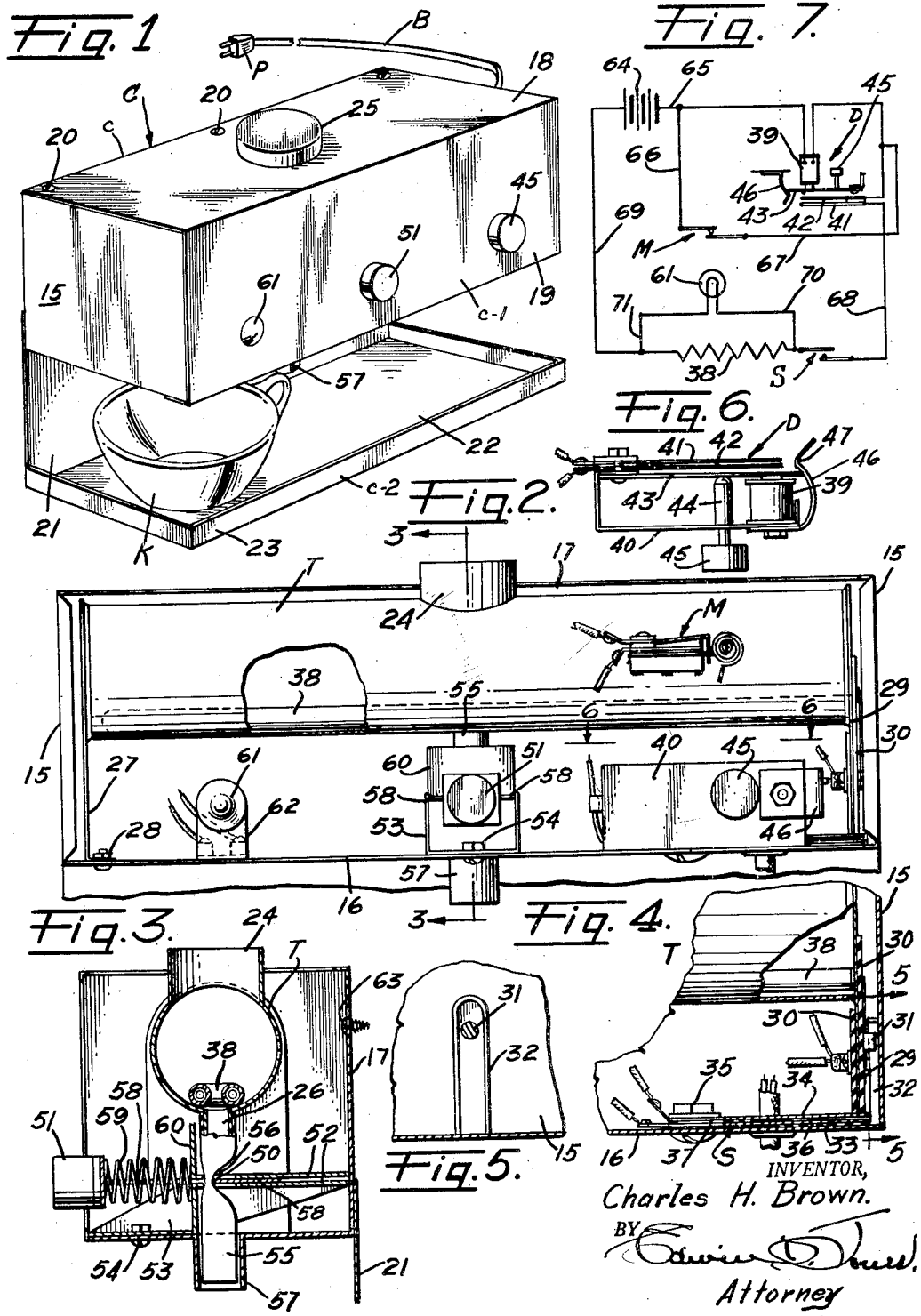
INVENTOR,
Charles H. Brown.
BY
Attorney United States Patent Office 2,819,377
Patented Jan. 7, 1958

2,819,377

WATER-HEATING APPARATUS FOR USE IN MAKING HOT BEVERAGES

Charles H. Brown, San Diego, Calif., assignor to Morning Coffee, Inc., San Diego, Calif., a corporation of California Application October 22, 1956, Serial No. 617,535

10 Claims. (Cl. 219—38)

My invention relates to water-heating apparatus, and it has for a purpose the provision of such an apparatus particularly designed to automatically heat water in relatively small quantities for use in the making of hot beverages for individual consumption, and whereby one may quickly make his own beverage when and as desired.

My apparatus is characterized by its structural simplicity and low cost of manufacture, easy mode of operation and portability to render it readily movable from place to place, and further by the fact that it is operable to electrically heat the water only to a temperature suitable for making hot beverages by plugging it into a wall socket or other electrical outlet. These characteristics render the apparatus suitable for use in the home or office, on land, water or air vehicles, and particularly in the guest rooms of hotels, motels, and auto courts where it can be suitably secured against surreptitious removal.

Adaptation of the apparatus to the guest rooms of hotels find it particularly advantageous since a guest may instantly prepare his own hot beverage without resorting to room service, assuming that as intended in conjunction therewith the hotel management has previously provided the guest with the necessary ingredients to make the hot beverage, say, for example, packaged sugar, powdered cream, and instant coffee for making coffee. Such use of the apparatus not only provides a convenience for the guest, but, in eliminating room service for this purpose, reduces hotel operational costs.

It is also a purpose of my invention to provide a water-heating apparatus which embodies a tank for the water to be used in the making of a hot beverage; an electrically heating element in the tank; manually controlled means for initiating supply of electrical current to the heating element; automatic means for discontinuing current supply to the element once the water becomes heated to a temperature suitable for hot beverage making, and restoring the parts of the manually controlled means to positions for subsequent re-operation when desired; and means visibly indicating to the user when the current supply to the heating element is initiated and discontinued.

It is also a purpose of my invention to provide a water-heating apparatus of this character wherein the water tank is movable in response to the weight of the water placed therein to close a switch permitting current supply to the water-heating element upon operation of the aforesaid manually controlled means, and, conversely, to open the switch when the tank is empty to prevent current supply to the heating element even though the manually controlled means may be operated, and whereby burning out of the tank is prevented.

A further purpose of my invention lies in a valve structure for controlling discharge of water from the tank, which has parts relatively movable in response to movement of the tank to compensate for such tank movement and yet not interfere with the intended operation of the valve structure.

I will describe only one form of water-heating apparatus for use in making hot beverages embodying my invention, and will then point out the novel features thereof in claims.

In the accompanying drawings:

Fig. 1 is a view showing in perspective one form of water-heating apparatus embodying my invention.

Fig. 2 is an enlarged elevational view of the apparatus with the cover section of the casing removed.

Fig. 3 is a vertical sectional view taken on the line 3—3 of Fig. 2.

Fig. 4 is a fragmentary vertical sectional view with a part of the tank broken away.

Fig. 5 is an enlarged vertical sectional view taken on the line 5—5 of Fig. 4.

Fig. 6 is a horizontal top plan view taken on the line 6—6 of Fig. 2.

Fig. 7 is a diagrammatic view of the apparatus showing the circuits involved.

Referring more particularly to the drawings, my invention in its present embodiment comprises a casing or housing C constructed of metal, plastic or other suitable material, and which is preferably of rectangular form. It is made up of a main section c, and cover section c-1, and a tray section c-2.

The main section c comprises flanged end walls 15, a bottom wall 16, and a flanged back wall 17. The cover section c-1 comprises a horizontal wall 18 and an integral vertical wall 19. Screws 20 detachably secure the cover section c-1 to the main section c so as to close the top and front of the main section and to thereby form a casing in which the parts of the apparatus are contained.

The tray sections c-2 comprises a vertical wall 21 and a horizontal wall 22 formed with flanges 23 so that it constitutes a tray on which one or more cups K may be supported. The vertical wall 21 is welded or otherwise secured to the back wall 17 so as to depend from the latter so that the horizontal wall 22 is disposed beneath and in parallel spaced relation to the bottom wall 16 of the casing.

Within the casing C is a metal tank T adapted to contain water or any other liquid and which is preferably of cylindrical form. On its top side the tank is formed with a filling spout 24 which extends upwardly through the wall 18 and is normally closed by a cap 25. Of course, through this spout the tank is adapted to be filled with water or other liquid, and it can be emptied therefrom through an outlet spout 26. The tank is disposed lengthwise within the casing C, and is mounted at one end on the wall 16 by an arm 27 which, at its upper end, is welded to the tank end, and at its lower end, is secured to the wall 16 by bolts 28. This arm 27 is constructed of spring metal so that it can flex to allow downward movement of the other end of the tank when the tank is substantially filled with water.

Secured to the free end of the tank T and depending therefrom is a plate-like metallic member 29, and to opposite sides of this member are plates of insulating material 30 (see Figs. 2 and 4). A pin 31 is secured to and projects laterally from one of the plates 30, and into a guide 32 secured to the inner side of one end wall 15 (see Fig. 5). This pin and guide serve to confine movement of the free end of the tank, and more particularly the member 29, to a vertical path in order that it, as well as the plates 30, may be utilized to close a switch S.

The switch S is best shown in Fig. 4 as comprising a fixed contact arm 33, and a movable contact arm 34. These arms are secured to the top side of the wall 16 by a bolt 35, the arm 33 being insulated from such wall by a sheet 36. The two arms are not only insulated from each other by a plate 37 of insulating material, but are spaced one from the other at their free ends so that normally the switch is open. The free ends of the contact arms 33 and 34 are disposed directly below the member 29 and the plates 30 so that when the adjacent end of the tank T is depressed these elements will operate to move the contact arm 34 into engagement with the contact 33 and thus close the switch.

For heating the water in the tank T to a predetermined degree, and preferably to less than to a boiling temperature, an electrical heating element 38 is contained within the tank. The supply of current to this element is controlled by a thermo-responsive switch M which is of conventional construction and hence requires no detailed description. This switch is secured to the outer side of the tank so as to close when the tnak becomes heated to a predetermined degree.

A third switch, designated generally at D, is provided, which, while normally open, is adapted to be manually closed, and through a latching means is retained in closed position until it is opened by energization of an electro-responsive device 39. This switch D is mounted on a frame 40 secured on but insulated from the horizontal wall 16. As best shown in Fig. 6, the switch comprises a stationary contact arm 41 and a movable spring contact arm 42 both secured at one end to one end of the frame 40 and insulated from each other and leaving their free ends spaced from each other so that normally the switch is open.

As aforesaid, switch D is adapted to be manually closed, and once in closed position is maintained therein by a latch means. The means for manually closing the switch comprises a spring arm 43 secured at one end to one end of the frame 40, and to which is connected a push rod 44 that is movable through the frame with its outer end provided with a knob 45 of insulating material which projects from the front wall of the casing so that it can be pushed inwardly to cause the rod to flex the arm and thus move the contact arm 42 into engagement with the contact arm 41.

The latching means for switch D comprises a spring metal latch arm 46 that cooperates with the arm 43 to maintain the latter in switch-closing position. This latch arm 46 is secured at one end to the frame 40 and curved to provide a bill 47 at its free end which is disposed in the path of movement of the free end of the arm 43 so that when the latter is pushed inwardly to close the switch the bill latches the arm in such position to maintain the switch closed.

Once the switch D is closed and latched as above described, it can be opened only by energization of the device 39. This device is in the form of an electro-magnet secured to the frame 40 so that its core is disposed adjacent the free end of the arm 43. Upon energization of this magnet the arm 43 is attracted to move its free end free of the bill 47 and out of engagement with the contact arm 42, thus permitting the switch to open.

To discharge water from the tank T when and as required, once it is heated by the element 38 to the temperature necessary for hot beverage purposes, a normally closed valve 50 can be manually opened by pushing inwardly on a knob 51 projecting from a suitable opening in the front wall 19 of the casing. This valve 50 is of flat blade form and is slidable at its inner end between parallel spaced plates 52 of a frame 53 secured to the upper side of the wall 16 by a bolt 54.

To compensate for the afore-described vertical movement of the tank T to open and close the switch S, a compressible tube 55, preferably formed of rubber or a composition thereof, is employed. This tube 55 is secured at its upper end to the outlet spout 26 so as to extend downwardly through an opening 56 in the plates 52 with its lower end extending into an outlet nozzle 57. Integral with the valve 50 at the forward end thereof is a U-shaped yoke 58 to the forward end of which the knob 51 is secured.

A coiled spring 59 is mounted in the yoke 58 with one end abutting the knob 51 and the other end abutting a vertical portion 60 of the frame 53. This spring 59 serves to urge the valve 50 to a position in which it compresses the tube 55 to prevent the discharge therethrough of water from the tank, and it will be understood that by pushing in on the knob 51, the valve 50 can be moved inwardly to allow the tube to expand, thus permitting water to be discharged from the tank.

For the purpose of indicating to the user when the element 38 is energized to heat the water in the tank T, a signal lamp 61 is provided. This lamp is secured in a suitable socket on a frame 62 fixed to the upper side of the wall 16, and so that it partly projects from a suitable opening in the front wall 19. When the lamp 61 is illuminated, it, of course, indicates that the water is being heated, and when it is extinguished, indicates that the water has been heated to a degree necessary for hot beverage purposes.

In the use of the apparatus, it may be placed on a table or other support, or secured to a wall by screws 63 extended through the rear wall 17 of the casing. In describing the operation of the apparatus reference is had to the diagrammatic illustration in Fig. 7 in which the several switches of the apparatus are in those positions which they occupy when the tank T is empty. These switches, together with magnet 39, lamp 61 and heating element 38, are embodied in a circuit including a battery 64, or other source of current, all in the manner illustrated in Fig. 7. Here it will be seen that switch M is closed, switch D open and switch S open, because the tank is, by virtue of being empty, urged to an elevated position by the arm 27, wherein member 29 and plates 30 are out of contact with switch arm 34. Obviously, under these conditions, there is no current flow through the circuit.

In actual practice, and as shown in Fig. 1, the apparatus has conductors B extended from the casing C and provided with a plug P which is adapted to engage within a wall socket to provide the necessary source of current instead of the battery 64.

Upon filling the tank with water, not necessarily completely, but sufficient so that the weight of the water overcomes the upward urging action of the arm 27, the tank is swung downwardly to cause its free end to occupy a lowered position in which the member 29 and plates 30 are depressed to close the switch S. Thus the apparatus is set to heat the water in the tank when desired through a mere closing of the switch D. Upon closure of switch D, current is supplied to element 38 through the following circuit: From one side of battery 64 through wires 65 and 66, switch M, wire 67, switch D, wires 68, heating element 38, and wire 69 back to battery. The wires 65 and 69 correspond to the conductors B of Fig. 1.

Since lamp 61 is connected in parallel with element 38 as by wires 70 and 71, it becomes illuminated simultaneously with energization of the element. Switch M remains closed until the water in the tank is heated to a degree suitable for making coffee or any other hot beverage, when the circuit is automatically disrupted through opening of the switch M. Upon such circuit disruption current flow to element 38 ceases and is so visibly indicated by lamp 61 being extinguished. This notifies the user that the water has been heated to the proper degree for making a hot beverage.

Upon disruption of the afore-described circuit through opening of the switch M current flow is diverted from wire 66 through winding of magnet 39, thus energizing the magnet to actuate the afore-described latching means and thereby cause opening of the switch D. Simultaneously with this operation, the push rod 44 together with the knob 45 are restored to original position for a second operation when desired.

To discharge the heated water from the tank incident to making a hot beverage the valve 50 can be opened by pressing on the knob 51, and simultaneously placing the cup K on the tray 22 directly beneath the nozzle 57. Of course, the cup is supplied with the ingredients necessary to make a cup of coffee, or other hot beverage, so by mixing the ingredients with the hot water the particular beverage is completed for drinking.

Preferably the tank T is designed to hold water sufficient in quantity to make two or more cups of coffee or other hot beverage, but once it is emptied it automatically returns to elevated position under the urging action of arm 27, thus permitting switch S to open. Manifestly, since switch D was previously opened automatically as above described, the apparatus is now set for a second water-heating operation upon re-supplying the tank with water followed by manual closure of switch D.

Although I have herein shown and described only one form of water-heating apparatus for use in making hot beverages embodying my invention, it is to be understood that various changes and modifications may be made therein without departing from the spirit of the invention and the spirit and scope of the appended claims.

What I claim is:

1. A liquid-heating apparatus, including: a tank for liquid having an outlet in its bottom; an electrical liquid-heating element in the tank; a manually closable switch urged to open position; latching means operable to retain said switch in closed position when once moved thereto; electro-responsive means for actuating the latching means to cause opening of said switch; a thermo-responsive switch normally closed and associated with the tank so as to open when the liquid in the tank is heated to a predetermined temperature; a manually operable valve for the outlet; and a circuit so including a source of current, said element, said switches and said electro-responsive means, that when the manually closable switch is closed current will be supplied to said element to heat the liquid in the tank, and upon the liquid becoming heated to a predetermined temperature the thermo-responsive switch will open causing energization of the electro-responsive means and resulting in opening of the manually closable switch against the action of the latching means, thereby discontinuing current supply to said element from said source.

2. A liquid-heating apparatus, including: a tank for liquid having an outlet in its bottom; an electrical liquid-heating element in the tank; a manually closable switch urged to open position; latching means operable to retain said switch in closed position when once moved thereto; electro-responsive means for actuating the latching means to cause opening of said switch; a thermo-responsive switch normally closed and associated with the tank so as to open when the liquid in the tank is heated to a predetermined temperature; a manually operable valve for the outlet; a circuit so including a source of current, said element, said switches and said electro-responsive means, that when the manually closable switch is closed current will be supplied to said element to heat the liquid in the tank, and upon the liquid becoming heated to a predetermined temperature the thermo-responsive switch will open causing energization of the electro-responsive means and resulting in opening of the manually closable switch against the action of the latching means, thereby discontinuing current supply to said element from said source; and a signal lamp connected in the circuit so as to be illuminated only when said element is energized.

3. A water-heating apparatus, including: a support; a tank for water mounted on the support for movement so that one end portion of the tank occupies an elevated position when the tank is substantially empty of water and a lowered position when the tank is substantially filled with water; a valve-controlled water outlet in the bottom of the tank; a switch on the support urged to open position and closable by the tank when said end portion is in lowered position; an electrical heating element in the tank; a manually closable switch urged to open position; latching means operable to retain the manually closable switch in closed position when once manually moved thereto; electro-responsive means for actuating the latching means to cause opening of said manually closable switch; a thermo-responsive switch normally closed and associated with the tank so as to open when water in the tank reaches a predetermined temperature; and a circuit so including a source of current, said element, said switches and said electro-responsive means, that with the first-mentioned switch closed, upon closure of the manually closable switch, current will be supplied to said element to heat the water in the tank, and upon the water becoming heated to a predetermined temperature the thermo-responsive switch will open causing energization of the electro-responsive means and resulting in opening of the manually closable switch against the action of the latching means, thereby discontinuing current supply to said element from said source.

4. A water-heating apparatus, including: a support; a tank for water mounted on the support for movement so that one end portion of the tank occupies an elevated position when the tank is substantially empty of liquid and a lowered position when the tank is substantially filled with liquid; a valve-controlled water outlet in the bottom of the tank; a switch on the support urged to open position; a member on said tank end portion positioned to close said switch when said tank end portion is moved to lowered position; guide means on said member and said support for guiding said member in its movement by the tank; an electrical heating element in the tank; a manually closable switch urged to open position; latching means operable to secure the manually closable switch in closed position when once moved thereto; electro-responsive means for actuating the latching means to cause opening of said manually closable switch; a thermo-responsive switch normally closed and associated with the tank so as to open when the liquid in the tank reaches a predetermined temperature; and a circuit so including a source of current, said element, said switches and said electro-responsive means, that with the first and third mentioned switches closed, upon closure of the manually closable switch, current will be supplied to said element to heat the liquid in the tank, and upon the liquid becoming heated to a predetermined temperature the thermo-responsive switch will open causing energization of the electro-responsive means and resulting in opening of the manually closable switch against the action of the latching means, thereby discontinuing current supply to said element from said source.

5. In a water-heating apparatus, a support; a tank for water mounted on the support for movement to occupy an elevated position when the tank is substantially empty of water, and a lowered position when the tank is substantially filled with water; a valve controlled water outlet in the bottom of the tank; a switch on the support urged to open position and closable by the tank when in lowered position; an electrical water-heating element in the tank; a normally closed thermo-responsive switch associated with the tank so as to open when the water in the tank reaches a predetermined temperature; a manually closable switch for supplying current from a source to said element through the first and second mentioned switches when the latter are closed; means for latching the manually closable switch in closed position when once moved thereto; and electro-responsive means for actuating the latching means to allow the manually closable switch to open once the thermo-responsive switch opens.

6. In a water-heating apparatus as embodied in claim 5, wherein the valve for controlling said outlet is yieldable to permit movement of the tank to occupy either of said positions.

7. A water-heating apparatus, including: a support; a tank for water; a resilient member secured to one end of the tank and to the support for supporting the tank so that the opposite end thereof occupies an elevated position when the tank is substantially empty of water and a lowered position when the tank is substantially filled with water; a switch on the support urged to open position; a member fixed to and depending from the last-mentioned end of the tank for closing the switch when the tank is in lowered position; an electrical heating element in the tank; a second switch on the support urged to open position; manually operable means for closing the second switch including a resilient arm urged to one position and manually movable to another position for closing the second switch; a spring latch for retaining said arm in switch-closing position; electro-responsive means for moving said arm free of said latch so that the second switch can open; a thermo-responsive switch normally closed and associated with the tank so as to open when water in the tank reaches a predetermined temperature; and a circuit so including a source of current, said element, said switches and said electro-responsive means, that with the first-mentioned switch closed, upon closure of the second switch, current will be supplied to said element to heat the water in the tank, and upon the water becoming heated to a predetermined temperature the thermo-responsive switch will open causing energization of the electro-responsive means to open the second switch against the action of said latch, thereby discontinuing current supply to said element from said source.

8. A water-heating apparatus as embodied in claim 7, wherein a water outlet is provided in the bottom of the tank; a flexible hose is connected to said outlet and extends through said support; a member is movably mounted on the support to transversely compress said hose and close the same; spring means for urging the member to hose-compressing position; and means for moving said member to a hose non-compressing position against the action of said spring means.

9. A portable apparatus for heating water in small quantities for use in the making of a hot beverage, including: a tank for water; an electrical heating element in the tank; manually controlled means for initiating supply of electrical current to the heating element; automatic means for discontinuing current supply to the element once the water becomes heated to a temperature suitable for hot beverage making; means operable resultant of operation of said automatic means for restoring the parts of the manually controlled means to positions for subsequent re-operation when desired; and means visibly indicating to the user when the current supply to said heating element is initiated and discontinued.

10. A liquid-heating apparatus, including: a tank for liquid having an outlet in its bottom; an electrical-heating element in the tank; a switch; manually-operable means for closing the switch; thermostatically-controlled means for opening the switch; a signal lamp; and a circuit so including a source of current, the thermostatically-controlled means, said element, the switch, and said lamp, that when the switch is closed current will be supplied to said element to heat the liquid in the tank and to illuminate the lamp, and upon the liquid becoming heated to a predetermined temperature the thermostatically-controlled means will be actuated to open the switch thereby discontinuing current supply to said element and said lamp from said source.

References Cited in the file of this patent
UNITED STATES PATENTS

| | | |
|---|---|---|
| 1,920,013 | Green | July 25, 1933 |
| 2,016,358 | Blackmun et al. | Oct. 8, 1935 |
| 2,198,404 | Conill | Apr. 23, 1940 |
| 2,643,322 | Lime et al. | June 23, 1953 |